United States Patent [19]

Minto et al.

[11] 3,750,393
[45] Aug. 7, 1973

[54] PRIME MOVER SYSTEM
[75] Inventors: Wallace L. Minto; Leonard J. Keller, both of Sarasota, Fla.
[73] Assignee: Kinetics Corporation, Sarasota, Fla.
[22] Filed: June 11, 1971
[21] Appl. No.: 152,325

Related U.S. Application Data
[63] Continuation-in-part of Ser. No. 40,623, May 26, 1970, abandoned.

[52] U.S. Cl. ......................................... 60/36, 60/39
[51] Int. Cl. ............................................. F01k 25/06
[58] Field of Search ............................ 60/36, 39, 40; 418/201, 202

[56] References Cited
UNITED STATES PATENTS

| 726,770 | 4/1903 | Siple ...................................... 60/39 |
| 3,006,146 | 10/1961 | Jackson ................................. 60/40 |
| 3,511,049 | 5/1970 | Norton et al. .......................... 60/36 |
| 3,529,617 | 9/1970 | Huber .............................. 418/15 X |
| 3,584,457 | 6/1971 | Davoud.................................. 60/36 |
| 3,479,817 | 11/1969 | Minto .................................... 60/36 |

FOREIGN PATENTS OR APPLICATIONS

| 1,644 | 5/1873 | Great Britain ......................... 60/40 |
| 10,609 | 4/1897 | Great Britain......................... 60/40 |
| 959,833 | 6/1964 | Great Britain...................... 418/201 |

Primary Examiner—Martin P. Schwadron
Assistant Examiner—Allen M. Ostrager
Attorney—Stanley Wolder

[57] ABSTRACT

A prime mover system employing in a closed circuit a volatile fluorocarbon drive medium with a low heat of vaporization includes as a vapor engine at least two intermeshing male and female helical screw elements with different numbers of teeth or a pair of eccentric inner and uer gerotor elements housed in a mating casing having inlet and outlet ports communicating with the contract and expanded expansion chambers delineated by the cooperating engine elements. The pressurized inlet vapor is directed to impinge on the chamber-defining grooves in the female screw to use the vapor flow momentum and a plurality of inlet ports afford different cut off points to the engine chambers and hence adjustability of the engine torque characteristics. A valve system permits the feed of the high pressure apor to the exhaust ports to provide engine reversibility. Liquid drive medium mixed with the vapor drive medium is fed to the engine input port and a fluorosilicone lubricant is carried by the drive medium.

16 Claims, 6 Drawing Figures

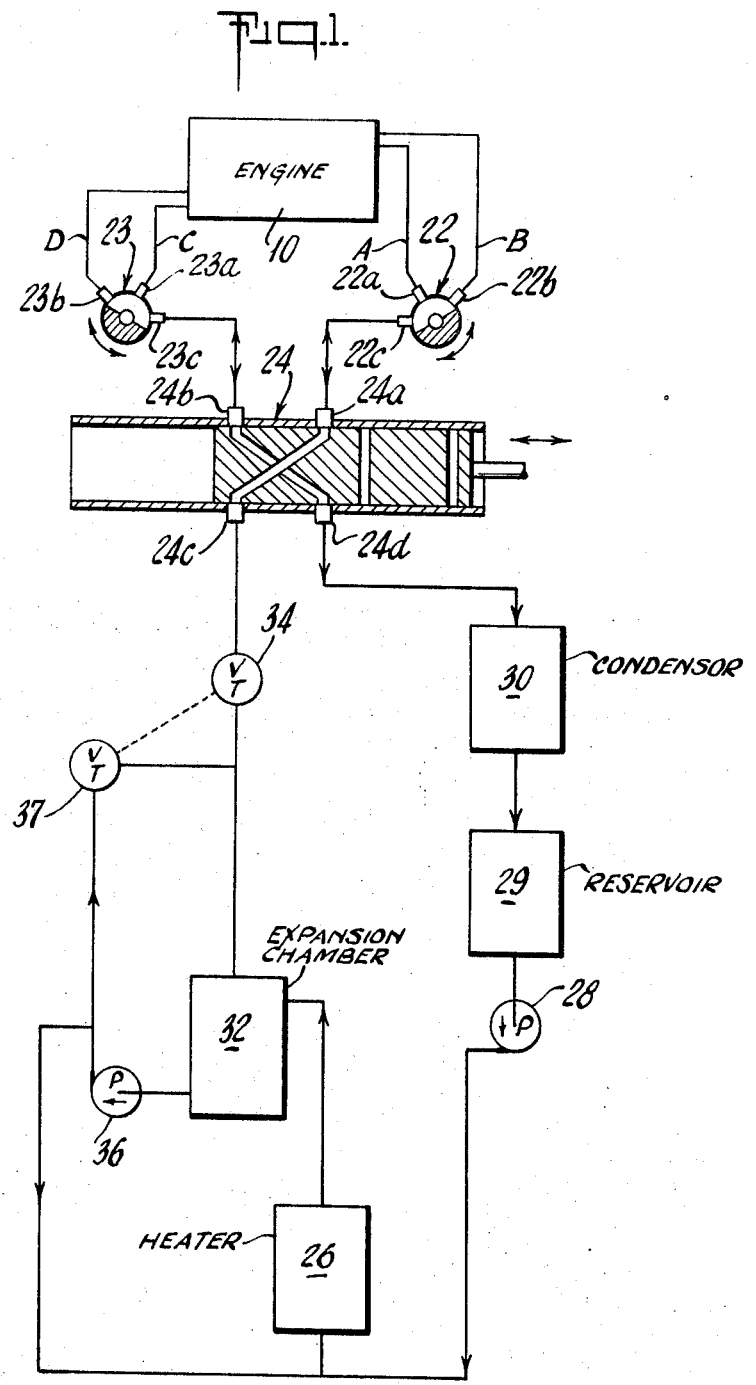

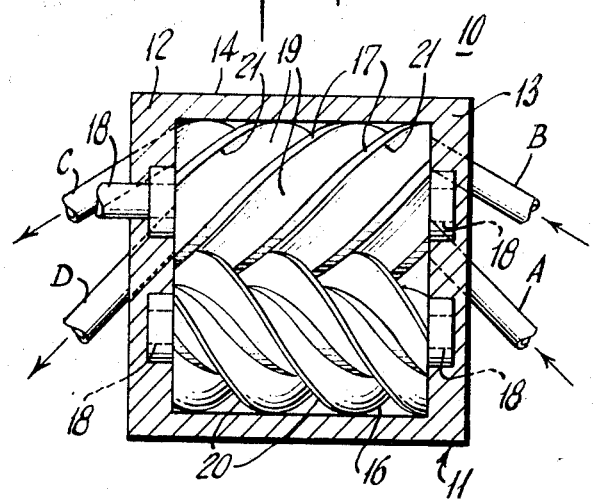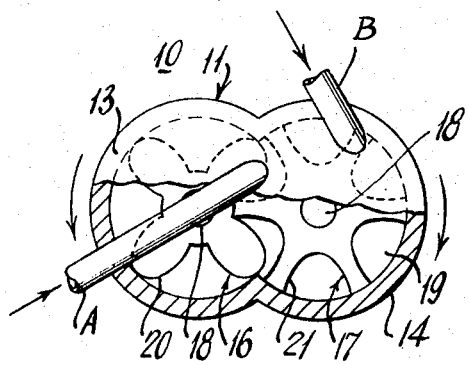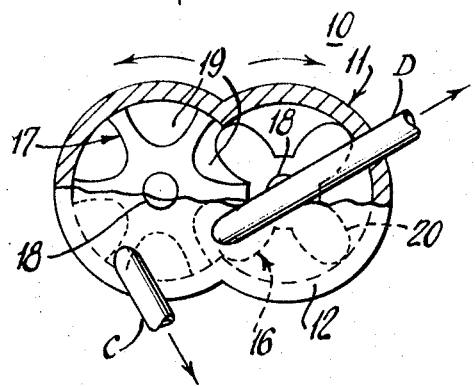

INVENTORS
WALLACE L. MINTO
LEONARD J. KELLER
BY
ATTORNEY

PRIME MOVER SYSTEM

REFERENCE TO RELATED APPLICATION

The present application is a continuation-in-part of co-pending application Ser. No. 40,623 filed May 26, 1970, now abandoned.

BACKGROUND OF THE INVENTION

The present invention relates generally to improvements in prime mover systems and it relates particularly to an improved external combustion engine system.

There are described in U.S. Pat. No. 3,479,817 granted Nov. 25, 1969 to W.L. Minto and in co-pending application Ser. No. 856,729 filed Sept. 10, 1969, now U.S. Pat. No. 363706, in the name of W.L. Minto external combustion engine systems employing as a drive medium in a closed sealed circuit fluorocarbon compounds having low latent heat of vaporization and desirable boiling points. While the systems described in the aforesaid patent and patent applications are in many respects superior to the conventional prime mover systems employing steam as the drive medium, the use therein of conventional vapor engines, as typified by the turbine and reciprocating engine, is accompanied by numerous drawbacks and disadvantages. These drawbacks and disadvantages are consequent to the operating and flow characteristics of the conventional engines particularly when employed with the fluorocarbon drive medium whose properties in many critical areas are radically different from that of steam. In addition to the usual drawbacks of the reciprocating engine including high inertial losses, poor torque speed characteristics, high friction and high maintenance requirements, particularly at higher speeds, the high losses and inefficiencies attendant to the operation of that engine due to the numerous changes in the direction of flow of the drive medium through the engine are aggravated by the use of a fluorocarbon drive medium by reason of its relatively high specific weight. The reciprocating piston engine is thus limited to relatively low speed, with attendant low ratios of horsepower output per unit engine volume, particularly when driven by vapors of high molecular weight. The turbine, on the other hand, is a low-torque engine which in many applications requires the use of expensive energy-consuming transmissions, is inefficient at speeds less than its designed speed, requires relatively low inlet-exhaust pressure difference per stage and has a relatively high size to torque ratio. Thus the use of reciprocating engines or turbines with fluorocarbon drive mediums leaves something to be desired.

SUMMARY OF THE INVENTION

It is a principal object of the present invention to provide an improved prime mover system.

Another object of the present invention is to provide an improved external combustion prime mover system.

Still another object of the present invention is to provide an improved vapor engine prime mover system employing a fluorocarbon drive medium.

A further object of the present invention is to provide a prime mover system of the above nature characterized by its high efficiency, ruggedness, simplicity, excellent torque and speed characteristics, low maintenance requirements, and great reliability, adaptability and versatility.

The above and other objects of the present invention will become apparent from a reading of the following description taken in conjunction with the accompanying drawing which illustrates a preferred embodiment thereof.

In a sense the present invention contemplates the provision of an improved prime mover system in which the drive medium is a non-flammable liquid compound having a latent heat of vaporization of less than 100 gram calories per gram and a boiling point of less than 100° C at atmospheric pressure and characterized by the use of a vapor engine including at least two male and female defining oppositely pitched helical rotor screws having different numbers of teeth intermeshing along a longitudinally extending area of engagement and extending from a leading input end to a trailing outlet end, a casing housing said screws and having faces in substantially fluid-tight engagement with the peripheries of said screws and an inlet communicating with the leading section of said female screw and an outlet port communicating with the trailing end of said female screw, said female screw having chamber defining grooves and said male screw having helical lobes engaging the faces of said chamber grooves along said intermeshing area, said screws rotating in predetermined opposite directions under the influence of a pressurized fluid introduced through said input port. An output drive shaft is connected to one or both screws and projects by way of suitable seals or glands through the casing. It should be noted that more than two intermeshing rotor screws may be employed, for example two female rotors engaging a common male rotor. Examples of mechanisms which may be employed and modified for the present purpose are described, in among others, U.S. Pat. Nos. 1,698,802, 2,578,196 and 3,016,842.

Alternatively, a gerotor may be advantageously employed as the vapor engine in place of the helical screw engine. A gerotor is a positive displacement pump of known construction including a pair of eccentric inner and outer intermeshing gerotor elements rotatable about parallel axes, the outer gerotor element having grooves in its inner surface parallel to the axis and the inner gerotor element having lobes, one less in number that the outer gerotor element grooves, and being always in fluid tight peripheral sliding engagement with the inner surface of the outer gerotor element. The gerotor elements are housed in a casing and the inner element is provided with an axial shaft. A plurality of fluid tight empansion chambers are defined by casing cavity end faces and the confronting faces of the gerotor elements and are delineated by successive lobes, each chamber, with the rotation of the gerotor, expanding from its contracted condition to an expanded condition than back to its initial contracted condition, such condition occuring, for each chamber, at the same position in the gerotor. A pair of circumferentially spaced inlet forward ports are provided proximate the chamber contracted position and an outlet port is provided proximate the chamber expanded position, and a reverse port is provided proximate the chamber contracted position on the opposite side of its full contraction from the forward ports.

The drive medium should advantageously be a flurocarbon compound preferably having at least two carbon atoms and three fluorine atoms per molecule and in addition thereto may contain hydrogen, oxygen, silicon and chlorine atoms in any desired combination to obtain the optimum thermodynamic properties desired. Mixtures and azeotropes of two or more of the above compounds may be employed as the drive medium and there may be admixed therewith a suitable compatible high boiling point lubricant which is liquid at normal operating pressures and temperatures, advantageously a flurosilicone lubricant. The above fluorocarbon compounds are characterized by their high lubricity, stability, vapor range and non-flammability, as well as their low heat of vaporization.

Advantageously the engine is provided with means for controlling the vapor cut-off to the successive expansion chambers and hence the chamber expansion ratio and engine torque. Expansion ratios of 1:1.5 to 1:30 are employed to advantage, the preferred range being 1:3 to 1:10 for operation without simultaneous liquid injection as will be hereinafter explained. Increasing the expansion ratio increases the engine's conversion efficiency, while decreasing the ratio maximizes output torque. By adjusting the expansion ratios the need for variable speed transmissions or torque converters is obviated, and such adjustment is achieved by varying the point at which communication between successive rotor chambers and the engine input is cut off, and this may be accomplished by providing peripherally-spaced input ports and controlling the communication between the ports and the heated vaporized drive medium. The engine vapor is advantageously directed at the leading faces of the chamber faces so that the inertia of the inlet vapor is also converted to mechanical energy with a resulting increase in engine efficiency, particularly at higher engine speeds.

A further increase in efficiency is achieved by injecting or admixing with the engine inlet vaporized drive medium in the liquid state. Unlike most substances the fluorocarbon compounds suitable for use as drive media tend to superheat upon isentropic expansion from the saturated vapor. The superheat enthalpy may be used to vaporize additional liquid drive medium within the engine, increasing the volume of vapor and furnishing additional work of expansion. The pressure required to inject said liquid into the engine may be supplied by the boiler feed or other pump. The temperature of the liquid may be as low as that of the condenser outlet, or as high as that of the hot saturated liquid in the boiler in equilibrium with the saturated vapor being used to drive the engine, or any intermediate temperature.

The proportion of liquid to be injected is readily calculable from the relative enthalpies of the liquid injected and that of the exhaust vapor that would occur without admixture of liquid. In this calculation, allowance should be made for the fact that expansion of the vapor in the engine is not truly isentropic, hence the enthalpy and superheat of the exhaust is greater than it would be if expansion was truly isentropic. The proportion of liquid injected into the engine should be such that the resultant exhaust, after admixture, contains a minimum of superheat. Indeed, it is preferable that the exhaust condition be within the saturation line at condenser pressure, say at 80 percent or 90 percent quality. The presence of liquid droplets suspended in the vapor materially improves sealing across lines of approximation of the surfaces of the moving engine parts and assists in lubricating them to minimize wear or damage. By such admixture of liquid with the engine inlet vapor, a greater total volume of gas passes through the engine, and the work output of the engine becomes a larger fraction of the net heat input to the boiler, resulting in improved thermal efficiency of the system. It is to be noted that this advantageous result can only be obtained with substances which superheat upon expansion of their saturated vapors.

The admixture of liquid and gas should preferably take place within the engine expansion chambers, although for practical purposes the admixture may take place at any point prior thereto, since it will require a finite period of time to equilibrate, which equilibration will occur under the turbulent conditions of flow within the engine. It is advantageous to inject a portion of the liquid at relatively low temperature into the engine by such means as to cause it to flow through the bearings, thereby cooling and lubricating them, with well-known advantages thereby. The liquid injected into the bearings at the high pressure end will admix with the vapor in the engine, increasing its efficiency as outlined above.

The fluorosilicone lubricant is admixed with the original charge of fluorocarbon drive fluid, in which it is soluble, particularly at elevated temperatures. Since the fluorosilicone is soluble therein, ebullition of the fluorocarbon in the boiler results in a vapor containing entrained microdroplets of fluorosilicone, which are carried into the engine and lubricate its moving parts. The fluorosilicone droplets redissolve in the fluorocarbon liquid in the condenser and the resultant solution has higher lubricity than the fluorocarbon alone, lubricating the boiler feed pump, circulating pump seals and all other moving parts in the system. The fluorosilicone is unaffected by the relatively low boiler temperatures required to vaporize the fluorocarbon drive medium (less than 250° C). Hence it circulates freely and unchanged throughout the entire system. We have found that less than 1 percent of fluorosilicone by weight of the fluorocarbon is adequate, and 0.2 percent by weight is our usual proportion.

The prime mover system of the present system employing as a drive medium the specified fluorocarbon compounds and helical screw engine is far superior to a system using a fluorocarbon drive medium and conventional vapor engines in its lower cost, higher efficiency, versatility and adaptability and its improved torque speed characteristics, great reliability and low maintenance. Moreover, the improved system is far superior to a corresponding system employing steam as a drive medium for similar reasons, including the poor lubricity of steam and its tendency to condense on expansion.

BRIEF DESCRIPTION OF THE DRAWINGS

FIG. 1 is a schematic diagram of a prime mover system embodying the present invention;

FIG. 2 is a top plan view partially broken away, of the vapor engine forming part of the improved system;

FIG. 3 is a left hand end view thereof;

FIG. 4 is a right hand end view thereof;

DESCRIPTION OF THE PREFERRED EMBODIMENT

Figure 5:
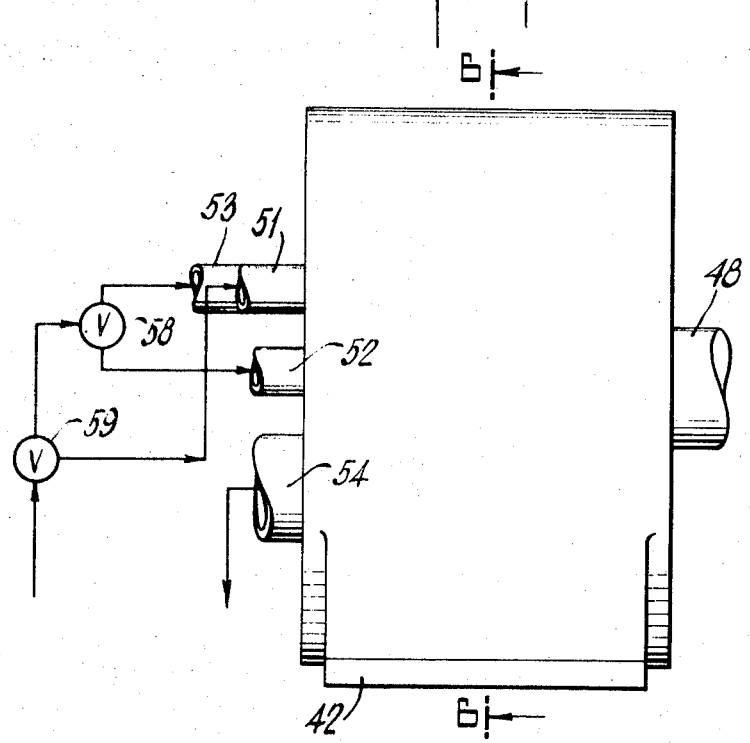
FIG. 5 is a partially schematic and front elevational view of another embodiment of the present invention.

Referring now to the drawings, particularly FIGS. 1 to 4 thereof which illustrate a preferred embodiment of the present invention, the reference numeral 10 generally designates a helical screw rotor engine which forms part of a closed vapor liquid circuit of the nature described in the above identified patent and patent application of W. L. Minto modified as hereinafter set forth. The engine 10 comprises a housing 11 including opposite end walls 12 and 13 and a peripheral wall 14 having a transverse cross-section delineated by intersecting circles.

A pair of mating, helical screw, male and female defining rotors 16 and 17 respectively are located in the housing 11 and are provided with axial end shafts 18 which are journalled in corresponding pairs of axially aligned bearings mounted on end plates 12 and 13, at least one of the shafts 18, for example that connected to female rotor 17, projecting by way of a suitable seal through one of the end plates and defining the engine drive or output shaft.

The rotors 16 and 17 fit in the casing 14 to close tolerances to minimize any leakage between the rotors and the peripheral and end faces of housing 11. The female rotor 17 has a plurality of similar helical chamber or cylinder defining grooves 19 formed therein, each of which extends for somewhat less than 360° about the rotor 17 from the leading to the trailing end thereof, for example six grooves 19 in the illustrated embodiment. The male rotor 16 includes a plurality of similar helical piston defining lobes 20, four in number in the illustrated embodiment. Successive lobes 20 register with successive grooves 19 along a longitudinally-extending intermeshing zone and form a rolling fluid tight engagement therewith the opposite concurrent rotation of the meshing rotors 19 and 20. Thus the lobes 20 define pistons which slide along cylinder or chamber defining grooves 19 so that these successive chambers expand from the leading or input and proximate end plate 13 at the rotor intermeshing zone with the rotors 16 and 17 rotating clockwise and counterclockwise resepctively as viewed in FIG. 3. The lobes 20 disengage respective grooves 19 in less than one revolution and before the leading end of the respective groove again reaches the intermeshing zone.

A pair of pressurized vapor inlet conduits A and B respectively extend through corresponding openings in leading end plate 13 providing communication with the leading end of housing 11 and grooves 19 at a point shortly following the rotor intermeshing zone in the clockwise direction therefrom wherein the chamber in the communicating groove 19 is expanded a small predetermined amount by the mating lobe 20, and at a point further removed in the clockwise direction from the first point where the chamber in the groove 19 registering therewith is further expanded by the mating lobe 20. Thus the engine expansion chamber defined by mutual engaging groove 19 and lobe 20 is greater when communicating with conduit B than with conduit A and receives either individually or in aggregate a greater volume of pressurized vapor in the former case, that is when the chamber communicates with conduit B or conduits A and B than with conduit A alone.

A pair of exhaust conduits C and D, respectively, provide communication with the grooves 19 through the trailing end plate 12 and are positioned in a manner similar to conduits A and B. Thus successive grooves 19 maintain their pressure even after they have been disengaged by corresponding lobes 20 by reason of the closure of opposite ends thereof until their trailing ends reach exhaust conduit C through which the pressurized vapor in the corresponding grooves is discharged. It should be noted that pressurized vapor may be fed to conduits C and D and conduits A and B connected to exhaust under which conditions the rotors 16 and 17 will be rotated in a reverse direction to that when the pressurized vapor is fed through conduits A and B.

The conduits A and B as well as the conduits C and D extend in a direction toward the leading face 21 of the respective groove in registry therewith, preferably perpendicular thereto. Thus, the pressurized vapor fed by any of the conduits A, B, C or D into the engine impinges on the corresponding leading groove face 21 to impart torque to the rotors as a consequence of the momentum of the inflowing vapor.

As seen in FIG. 1 of the drawing the conduits A and B are connected respectively to the outlet ports 22a and 22b of a valve 22 having an inlet port 22c and the conduits C and D are connected respectively to the outlet ports 23a and 23b of a valve 23 having an inlet port 23c, the valves 22 and 23 each having actuators or spindles for selectively connecting the inlet ports to both respective outlet ports or the leading of the respective outlet ports that is ports 22a and 23a or to cut off the outlet ports. The valve inlet ports 22c and 23c are respectively connected to the outlet ports 24a and 24b of a valve 24 having inlet ports 24c and 24d which are alternatively respectively connected to the outlet ports 24a and 24b or 24b and 24a.

A drive medium heater or heat exchange unit 26 of any suitable type is heated in any suitable manner, for example by a conventional oil or gas burner, or by heat exchange with another fluid at higher temperature to raise the temperature of the liquid drive medium therein to close to the boiling point thereof, preferably to its nucleated boiling point, at the pressure in the heater unit, the inlet to the heater unit 26 being connected to the outlet of a condensate pump 28 which may be driven by engine 10 or by any suitable auxiliary drive means. The inlet to condensate pump 28 is connected to the outlet of a liquid drive medium reservoir tank 29 whose inlet is connected to the outlet of a heat exchange condenser unit 30 which may be suitably cooled by air or water. The inlet to condenser 30 is connected to valve port 24d.

The outlet of heater 26 is connected to the inlet of an expansion chamber 32 of the structure described in the above identified Minto application, the vapor outlet of which is connected successively through a selectively operable throttle valve 34 to valve port 24c. The liquid outlet of expansion chamber 32 is connected to the inlet of a suitably driven liquid pump 36 to the inlet to heater 26 and through a throttle valve 37 advantageously simulataneously adjustable with throttle valve 34 to the inlet of throttle valve 34.

The circuit illustrated in FIG. 1 is closed and hermetically sealed and is charged with a fluorocarbon drive medium of the nature specified above, for example, trichlorotrifluoroethane (R-113), dichlorotetrafluoroethane (R-114) and dichlorohexafluoropropane (R-216) or other fluorocarbon compounds with like properties and mixtures thereof. In addition the drive medium may have advantageously admixed therein, preferably less than 1 percent by weight, for example 0.2 percent of the drive medium, of a lubricant which is stable and inert in the drive medium and liquid at the pressure and temperature encountered in the network, for example, the fluorosilicone lubricants. The pressures and temperatures are regulated to the desired values in the manner described in the above identified Minto patent and patent application.

Considering now the operation of the prime mover system described above, under normal forward low torque operating conditions the valve 23 is adjusted to provide communication between only ports 22a and 22c, the valve 23 is adjusted to interconnect ports 23a, 23b and 23c and valve 24 is adjusted to interconnect valve ports 24a to 24c and 24b to 24d. The drive medium is heated just to the point of nucleated boiling in heater 26 and expanded in chamber 32 to produce vapor and liquid fractions. Part of the liquid fraction is recirculated by pump 36 to the heater 26 and part through valve 37 where it is admixed with the vapor from chamber 32 flowing through valve 34. It should be noted that the flow of the liquid drive medium from chamber 32 may be completely returned to the heater 26 and none admixed with the vapor. The drive medium vapor, with or without any drive medium liquid enters engine 10 through conduit A, and causes the rotation of rotors 16 and 17, by reason of the pressure and expansion of the vapor, assisted by the evaporating liquid, as earlier explained, and the reaction to the inlet flow of the drive medium. Since there is an early cut off of the inlet of conduit A a relatively small amount of the drive medium enters the successive engine cylinders with a resulting high expansion ratio and low torque. The engine exhausts through conduits C and D and the exhaust flows through valves 23 and 24 and is cooled and liquified in condenser 30 and stored in reservoir 29 from which it is pumped by pump 28 to the input of heater 26. If a greater engine output torque is desired valve 22 is adjusted to open ports 22a and 22b so that drive medium is delivered by conduits A and B to delay the vapor cut off point to a larger engine chamber expansion and deliver a greater amount of drive medium to successive chambers and hence reduce the expansion ratio and increase the engine output torque. The engine rotation is reversed merely by adjusting valve 24 so that ports 24a and 24b communicate with ports 24d and 24c respectively, the engine 10 operating reversely in a manner similar to its forward operation except that conduits A and B are now exhaust and C and D feed conduits. The engine speed may be varied by adjusting the throttle valve 34. The lubricant carried by the drive medium is circulated as described earlier.

The optimum operating parameters of the drive medium throughout the circuit and the engine expansion ratios depend on the specific drive medium and the use of liquid drive medium with the vapor. Thus expansion ratios of 1.0:1.5 to 1:30 are highly effective with expansion ratios of 1:3 to 1:10 being preferred in the absence of injected liquid drive medium. Where employed, the optimum ratio of liquid drive medium to the vapor drive medium and the optimum engine expansion ratios depend on the particular drive medium employed and other parameters and may be readily determined.

Advantageously the drive medium temperatures and pressures are 90° C to 325° C and 45 psia to 1,000 psia at the engine inlet, 25°C to 150°C and 5 psia to 250 psia at the engine exhaust, 25° C to 150° C and 5 psia to 250 psia at the condenser outlet, and 25° C to 150° C and 45 psia to 1,000 psia at the heater inlet. The following is given by way of illustration of specific operating parameters which may be employed with the specific working fluids or drive mediums specified:

|  | R — 113 | | R — 114 | | R — 216 | |
| --- | --- | --- | --- | --- | --- | --- |
|  | °C | psia | °C | psia | °C | psia |
| Engine Inlet | 170 | 250 | 155 | 500 | 170 | 350 |
| Engine Exhaust | 102 | 35 | 70 | 70 | 104 | 45 |
| Condenser Outlet | 75 | 35 | 60 | 70 | 72 | 45 |
| Boiler Inlet | 75 | 260 | < 60 | 510 | 72 | 360 |

The desired operating parameters may be achieved in the manner described in the above identified Minto patent and patent application.

Figure 6:
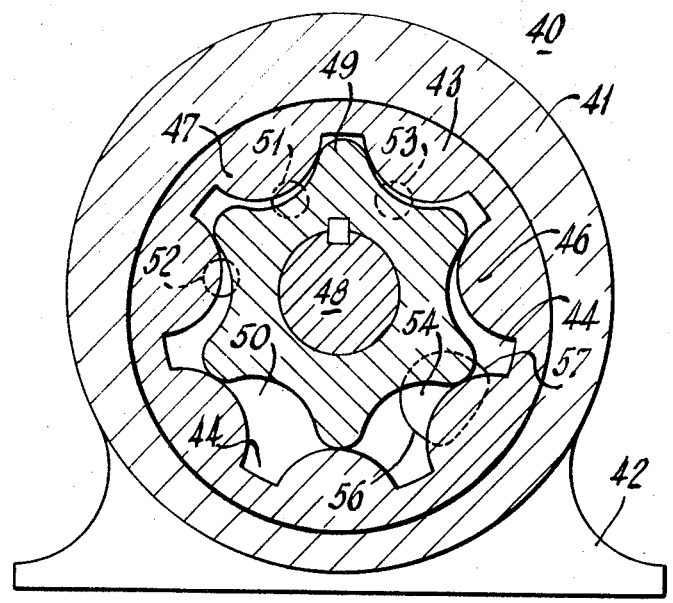
FIG. 6 is a sectional view taken along line 6 — 6 in FIG. 5.

In FIGS. 5 and 6 of the drawings there is illustrated another embodiment of the present invention which differs from that first described primarily in the structure of the vapor expansion engine. Specifically, in place of the helical screw engine 10 of the first embodiment there is employed, as a vapor engine, a gerotor 40 modified in the manner hereinafter described. The engine 40 includes a casing 41 having a large axial cylindrical housing bore closed at opposite ends in any suitable manner, such as by removable end plates, and provided with a base member 42 which facilitates the mounting of engine 40.

An outer gerotor element 43 freely rotatably mates the housing bore in casing 41 with the outer peripheral and end surfaces of outer gerotor element 43 being in substantial fluid tight engagement with the end and peripheral faces of the casing cavity. The outer gerotor element 43 is of known construction and includes an axial bore provided with regularly circumferentially spaced longitudinal grooves 44, illustrated as seven in number, it being understood that this number may be varied, the grooves 44 being separated by longitudinal ridges 46 of curved transverse cross section.

Registering with the bore of outer gerotor element 43 is an inner gerotor element 47 rotatable about an axis parallel and eccentric to that of outer gerotor element 43. Inner gerotor element 47 has end faces in fluid tight sliding engagement with the end faces of the cavity in casing 41 and is suitably journalled between the casing end walls and is provided with an axial output shaft 48 projecting through an end wall of casing 41. Inner gerotor element 47, like outer gerotor element 43, is of known construction and includes a plurality of longitudinally extending ridges or lobes 49 of curved transverse cross sections separated by curved longitudinal valleys 50, the number of lobes 49 being one less than the number of outer gerotor element grooves 44. The confronting faces of the inner and outer gerotor elements 47 and 43 are so shaped that each of the lobes 49 is in fluid tight linear longitudinal slideable or rolling engagement with the confronting face of the outer gerotor element 43 during the full rotation of the gerotor elements. A plurality of successive advancing expansion chamber 50 are delineated by the casing cavity end walls and the confronting faces of inner and outer gerotor elements 47 and 43 and separated by successive lobes 49. When an expansion chamber 50 is in its medial topmost position, as viewed in FIG. 6, that is in a position in transverse alignment with the axis of rotation of the gerotor elements 43 and 47 on the sides of the axis of inner gerotor element 47, the chamber is fully contracted and as it advances either clockwise or counterclockwise it expands until it reaches a 180° opposite position where it contracts with further advance toward its initial position. It should be noted that the inner gerotor element 47 advances one lobe relative the outer gerotor element 43 during each revolution thereof by reason of there being one less the number of lobes 49 than grooves 44.

A pair of circumferentially spaced forward inlet ports 51 and 52 are formed in the end wall of casing 41 and communicate with chambers 50 successively registering therewith, the ports 51 and 52 being so positioned that in the forward counterclockwise rotation of the gerotor the cutoff of port 52 to a communicating chamber 50 is later than that of port 51. A reverse inlet port 53 is likewise formed in an end wall of casing 41 and communicates with registering expansion chambers 50 at a point approximately symmetrical to port 51 relative to the vertical medial axis of the gerotor casing 41. Also formed in the end wall of casing 41 substantially diametrically opposite ports 51 and 52 is a large exhaust port 54 whose trailing edge 56 is reached by a forwardly advancing expanding chamber 50 when in its fully expanded condition and whose leading edge 57 is spaced from reverse port 53 a distance somewhat greater than the distance between successive lobes 49.

A valve 58 of the structure of valve 23 earlier described, has a pair of outlets connected to respective inlet ports 51 and 52 and an inlet connected to one outlet of a three way valve 59 whose other outlet is connected to reverse inlet port 53. The inlet to valve 59 is connected through a throttle valve to the vaporized high energy drive medium source, for example through an expansion chamber to a drive medium heater, as in the first described embodiment, and the exhaust port 54 is connected to the condenser in the drive medium circuit.

The operation of the prime mover last described is similar to that first described. For forward high torque operation, valve 59 is adjusted to communicate with valve 58 which is adjusted to communicate with both ports 51 and 52. The high pressure vapor enters successive chambers 50 to cause the expansion thereof and the rotation of the gerotor counterclockwise. When the chambers 50 reach exhaust port 54, the vapor exhausts therethrough to the condenser. For low torque operation valve 58 is adjusted to communicate only with port 51 and for reverse operation valve 59 is adjusted to communicate with port 53. In other respects, the operation of the prime mover of FIGS. 5 and 6 is similar to that shown in FIGS. 1 to 4 and may be similarly modified. In order to obviate binding between the outer gerotor element 43 and casing 41 along their confronting cylindrical faces consequent to any difference in pressure between the inner and outer faces of outer gerotor element 43, radial passageways are advantageously provided in the casing end wall extending from respective ports 51, 52, 53 and 54 to the inner cylindrical surface of casing 41, and communicating with and extending from the outer end of each radial passageway is a longitudinal groove formed in the casing inner cylindrical face.

While there have been described and illustrated preferred embodiments of the present invention, it is apparent that numerous alterations, omissions and additions may be made without departing from the spirit thereof:

We claim:

1. A prime mover system comprising a closed sealed circuit containing a drive medium selected from the group of fluorocarbon compounds containing at least 2 carbon atoms and three fluorine atoms per molecule and mixtures thereof and having a latent heat of vaporization of less than 100 gram calories per gram and a boiling point less than 95° C at atmospheric pressure, said closed sealed circuit comprising:

a vapor engine including a housing having an inlet and an outlet and rotor means delineating a plurality of expansion chambers positioned in said housing and advancing with the rotation of said rotor from a contracted condition communicating with said inlet to an expanded condition communicating with said outlet;

means including an input and an output for heating and vaporizing said drive medium;

means including an condenser having an input and output for cooling and liquifying said drive medium;

means for injecting liquid drive medium from said cooling and liquifying means into said heating and vaporizing means input;

means connecting the output of said heating and vaporizing means in a vapor state to the inlet of said engine;

means for feeding said drive medium in a liquid state into said engine inlet concurrently with said drive medium in a vapor state; and means connecting the outlet of said engine to the input of said cooling and liquifying means.

2. A prime mover system comprising a closed sealed circuit containing a drive medium selected from the group of fluorocarbon compounds containing at least 2 carbon atoms and three flourine atoms per molecule and mixtures thereof and having a latent heat of vaporization of less than 100 gram calories per gram and a boiling point less than 100° C at atmospheric pressure, said closed sealed circuit comprising:

a vapor expansion engine including a pair of rotatable male and female rotors having different numbers of lobes and grooves respectively which intermesh with the rotation of said rotors, a casing housing said rotors and delineating therewith a plurality of substantially fluid right expansion chambers which expand in volume with the rotation of said rotors between contracted and expanded conditions, said casing having an inlet and an outlet therein communicating with said chambers at relatively contracted and expanded conditions thereof respectively;

means including an input and an output for heating and vaporizing said drive medium;

means including a condenser having an input and output for cooling and liquifying said drive medium;

means for injecting liquid drive medium from said cooling and liquifying means into said heating and vaporizing means input;

means connecting the output of said heating and vaporizing means in a vapor state to the inlet of said engine;

means for feeding said drive medium in a liquid state into said engine inlet concurrently with said drive medium in a vapor state; and means connecting the outlet of said engine to the input of said cooling and liquifying means.

3. The prime mover system of claim 2 including means for cutting off communication between said expansion chambers and said inlet at a predetermined expanded position of said expansion chamber.

4. The prime mover system of claim 3 wherein said predetermined cut off point is adjustable.

5. The prime mover system of claim 2 wherein said drive medium has admixed therewith a lubricant compatible with said drive medium and liquid at the temperature and pressures of said drive medium throughout said closed circuit.

6. The prime mover system of claim 2 wherein the temperature and pressure of said drive medium at said engine inlet are between 90° C and 325° C and between 45 psia and 1,000 psia.

7. The prime mover system of claim 2 wherein the temperature and pressure of said drive medium at said engine outlet are between 25° C and 150° C and between 5 psia and 250 psia.

8. The prime mover system of claim 2 including an adjustable throttle valve between said heating means output and said engine input.

9. The prime mover system of claim 2 wherein said vapor engine rotors are defined by oppositely pitched male and female helical screws intermeshing along a longitudinally extending area of engagement and extending from a leading input end to a trailing outlet end, said casing housing said screws and having faces in substantially fluid tight engagement with the peripheries of said screws, said inlet communicating with the leading section of said female screw, said female screw having chamber defining helical grooves and said male screw having helical lobes engaging said chambers along said intermeshing area, said screws rotating in predetermined opposite directions under the influence of a pressurized fluid introduced through said input port.

10. The prime mover system of claim 9 wherein said helical chamber includes a radially projecting helical first surface having a component facing a direction opposite to that of the rotation of said female screw, and means for guiding the flow of said vaporized drive medium entering said engine input port in a direction toward said first surface.

11. The prime mover system of claim 10 wherein the angle between the direction of flow of said guided vaporized drive medium and said first surface proximate the leading section thereof is between a right angle and an obtuse angle with said flow direction being toward the axis of the respective rotor.

12. The prime mover system of claim 9 including means for selectively alternatively connecting said heating and vaporizing means output to said engine input or output and said cooling and liquifying means input to said engine output and input respectively.

13. The prime mover system of claim 9 wherein the trailing section of said engine female screw helical chamber forward of the engagement thereof with said helical lobe communicates with said engine outlet.

14. The prime mover system of claim 9 wherein said male and female screws are multi-threaded.

15. The prime mover system of claim 2 wherein said vapor engine comprises a gerotor including inner and outer eccentric gerotor elements defining said male and female rotors respectively, said outer gerotor element having a longitudinal bore and said inner gerotor element registering with said bore, said inner gerotor elements having regularly circumferentially spaced longitudinally extending outwardly directed lobes and said outer gerotor element bore having regularly circumferentially spaced longitudinally extending grooves, one greater in number than said lobes, said lobes being in peripherally movable fluid tight longitudinal linear engagement with the face of said outer gerotor element bore.

16. The prime mover system of claim 1 including a pair of said inlets communicating with said expansion chambers at opposite sides of the fully contracted condition thereof, and means for selectively connecting said inlets to said heating and vaporizing means to control the direction of rotation of said vapor engine.

* * * * *